United States Patent [19]

Eastman

[11] Patent Number: 5,275,837
[45] Date of Patent: Jan. 4, 1994

[54] STARCH HYDROLYSATES AS FAT REPLACEMENTS

[76] Inventor: James E. Eastman, 444 S. Westdale Ave., Decatur, Ill. 62522

[21] Appl. No.: 884,693

[22] Filed: May 18, 1992

[51] Int. Cl.$^5$ .......................... A23L 1/05; A23L 1/307
[52] U.S. Cl. ..................................... 426/661; 426/804; 426/658
[58] Field of Search ............... 426/578, 579, 658, 804, 426/661; 127/32; 536/102, 103

[56] References Cited

U.S. PATENT DOCUMENTS

| | | | |
|---|---|---|---|
| 3,799,805 | 3/1974 | Sugimoto | 426/658 |
| 3,986,890 | 10/1976 | Richter et al. | 426/578 |
| 4,510,166 | 4/1985 | Lenchin | 426/578 |

Primary Examiner—Jeanette Hunter
Attorney, Agent, or Firm—Philip L. Bateman

[57] ABSTRACT

Starch hydrolysates having a D.P. of about 20 to 200 and a D.E. of about 0.5 to 5 are used as fat replacements in food. The starch hydrolysates are prepared by heating granular starch containing at least about 20 weight percent amylopectin in an acidic slurry of water and a water-miscable organic solvent such as ethanol. The slurry is heated under conditions which do not gelatinize the starch but cleave at least about 20 percent of the terminal amylose groups from the amylopectin molecules.

18 Claims, No Drawings

STARCH HYDROLYSATES AS FAT REPLACEMENTS

FIELD OF THE INVENTION

This invention relates to starch hydrolysates, i.e., compounds produced from the reaction of starch and water. More particularly, this invention relates to the use of starch hydrolysates as replacements for fats in foods.

BACKGROUND OF THE INVENTION

Fats and oils are compounds widely used in food. There is no chemical difference between a fat and an oil, the only distinction being that fats are solid at room temperature while oils are liquid. For simplicity, the term fat will be used throughout to include both fats and oils. Fats form one of the three classes of foods, the other two being carbohydrates and proteins. Fats contain more than double the number of calories per unit weight of carbohydrates or proteins. Furthermore, fats in the diet have become linked with a wide number of other undesirable effects on humans, ranging from heart disease to cancer. While these undesirable effects are now widely recognized, the taste, mouthfeel, and other organoleptic properties of fat in food are so desirable that it is not feasible to simply omit fat from food. Accordingly, it would be beneficial to reduce or eliminate the level of fat in food by replacing it with other materials which mimic fat's organoleptic and functional properties. A wide variety of fat replacements and substitutes have been taught for this purpose, including sucrose polyesters, pectin, carageenan, protein microparticulates, beta-glucans, and hemicelluloses. However, to date, starch derivatives of various types have shown the most promise in serving as acceptable fat replacements.

Starch is a plant material whose chemical composition is a polymer of thousands of anhydroglucose ($C_6H_{10}O_5$) units. It is a member of the class of compounds known as polysaccharides in that it contains three or more saccharide units. It is also a member of the broader, carbohydrate class of compounds, which class includes monosaccharides, disaccharides, and polysaccharides. Starch molecules exist as essentially unbranched chains consisting predominantly of 1,4-linkages between the anhydroglucose units, known as amylose, and as branched chains consisting of both 1,4- and 1,6-linkages, known as amylopectin. The linear, short chain sections of the amylopectin molecule which are connected to the longer backbone are sometimes referred to as terminal amylose groups and generally are composed of about 10 to 50 anhydroglucose units.

Starch occurs naturally in plants in the form of granules having an average size of about 5 to 100 microns and containing thousands of individual starch molecules bound tightly together. Unmodified starch granules are insoluble in cold water, but can be dissolved by heating at a temperature of about 70° to 90° C. at atmospheric pressure, at which point the granules gradually swell and rupture and the individual molecules pass into solution. This process by which starch granules swell and rupture is alternatively referred to as gelatinization, pasting, or cooking.

The major commercial source of starch is corn (also known as maize), but potatoes, wheat, barley, rice, and tapioca are also important sources. The relative amounts of amylopectin (branched chains) and amylose (straight chains), as well as the average number of anhydroglucose units in a molecule (commonly known as the Degree of Polymerization, or D.P.) varies with the species of plant. For example, common dent corn starch contains about 72 percent amylopectin and 28 percent amylose; waxy maize corn starch contains nearly 100 percent amylopectin; and a common high amylose corn starch contains about 45 percent amylopectin and 55 percent amylose. Corn starch amylopectin has a D. P. of about 300,000 to 3,000,000 while amylose has a D. P. of about 800 to 8,000.

Corn starch is often modified chemically to alter its physical properties for a given application. One common modification is to substitute other chemical groups onto the hydroxyl groups of the starch molecules. The amount of substitution is expressed as the Degree of Substitution, or D.S. A starch molecule having one substituted group per anhydroglucose unit is defined as having a D.S. of one. A molecule having one substituent per 2 anhydroglucose units has a D.S. of 0.5., and so on. Another common modification is to treat the starch with an agent such as acid or enzyme to cleave some of the bonds between the anhydroglucose units and thereby reduce the average D. P. of the starch molecules. Starches having a reduced D. P. are said to be hydrolyzed or converted. They are often described in terms of their Dextrose Equivalent, or D. E., which is defined for an individual molecule as 100 / D. P. Accordingly, the monosaccharide dextrose, also known as glucose, has a D. P. of 1 and a D. E. of 100. Dextrose Equivalent is a convenient measure of the sweetness of a starch derivative and is widely used in the corn refining industry. In a mixture of molecules having different D.P.'s, D.E. can be viewed as a non-weighted average of the D.E.'s of the individual molecules. Depending upon the population distribution, two mixtures having the same average D.P. can have different D.E.'s, as shown by the following example.

Assume mixture A contains 6 starch derivative molecules, each one having a D.P. of 2 and a D.E. of 50. The average D.P. of the mixture is, of course, 2 (2+2+2+2+2+2/6) and the D.E. of the mixture is 50 (50+50+50+50+50+50/6). Now consider mixture B which also contains 6 molecules, but of the following distribution: The first molecule has a D.P. of 4 and a D.E. of 25; The second molecule has a D.P. of 3 and a D.E. of 33.33; The third molecule has a D.P. of 2 and a D.E. of 50; and the remaining three molecules each has a D.P. of 1 and a D.E. of 100. This mixture has an average D.P. of 2 (4+3+2+1+1+1/6), the same as mixture A. But mixture B has a D.E. of 68 (25+33.33+50+100+100+100/6).

As previously mentioned, a number of starch derivatives have been disclosed as fat replacements. One class of starch derivatives are those which are granular and converted in a non-alcohol process. Chiou et al., European Pat. Appln. No. 91-301368.6, published Aug. 28, 1991, which is incorporated by reference, discloses a granular starch hydrolysate prepared by heating starch in a strongly acidic, aqueous, non-alcohol slurry at a temperature below the gelatinization temperature. The resulting hydrolysate exhibits an unchanged ratio of 1,6- to 1,4- linkages, indicating that the conversion process cleaves the two types of linkages equally. The preferred starch hydrolysate has a D.E. of about 5.0 to 7.0 and an average molecular weight of about 4500 to 5000. These figures indicate that this hydrolysate contains a relatively high amount of low D.P. (<20) molecules. This hydrolysate is sold as a fat replacement under the trademark STELLAR by the A. E. Staley Manufacturing Company. The method of preparation disclosed by Chiou et al. is related to the well known Lintnerization process.

A second class of starch derivatives are those which are granular, alcohol-processed, but not converted. Eastman et al., U.S. Pat. No. 4,465,702, issued Aug. 14, 1984, discloses a nonbirefringent, cold-water-swelling, granular starch material prepared by subjecting ungelatinized starch, in a slurry in selected aqueous alcohols, to conditions of high temperature and pressure. The process does not significantly affect the D.P. of the starch molecules. This starch material is a component of the ready-to-spread cake frosting disclosed in Augustine et al., U.S. Pat. No. 4,761,292, issued Aug. 2, 1988. Augustine et al. state that the starch is believed to play a role in imparting a desirable consistency to the frosting even at relatively low fat levels.

A third class of derivatives taught as fat replacements are pregelatinized (nongranular) starches. Furcsik et al., International Pat. Appln. No. PCT/US90/04013, published Feb. 7, 1991, discloses gelatinized starch derivatives having a D.E. of 5 to 15 derived from high amylose starch which exhibit relatively high gel strengths and can be used as fat replacements. Zallie et al., U.S. Pat. No. 4,937,091, issued Jun. 26, 1990, and Chiu, U.S. Pat. No. 4,971,723, issued Nov. 20, 1990, disclose pregelatinized starch derivatives which are used to lend fat-like textures to aqueous dispersions, such as replacements for caseinate in imitation cheese. The derivatives are debranched using an enzyme, such as Pullulanase, which cleaves the 1,6- linkages in amylopectin. The preferred derivatives comprise about 80% short chain amylose and 20% partially debranched amylopectin. The use of enzymes to reduce D.P. suffers from several disadvantages. First, the process is slow. Second, biological contamination is possible. And third, the enzyme cannot act on granular starch so the process works only with pregelatinized starch.

A fourth class of starch derivatives are dextrins. Lenchin et al., U.S. Pat. No. 4,510,166, issued Apr. 9, 1985, discloses the use of tapioca dextrins having a D.E. of less than about 1.5 as fat replacements in certain foods. These dextrins retain their granular structure, but contain molecules randomly shortened by the conversion process.

A fifth class of starch derivatives worthy of mention are those which are aqueous-alcohol processed, even though they are not disclosed as fat replacements. Battists, U.S. Pat. No. 3,351,489, issued Nov. 7, 1965, discloses stable amylose dispersions prepared by heating amylose starch in boiling acidic liquid mediums containing water or other liquids such as sugar solutions, polyols, and alcohols. Exposure to these conditions gelatinizes the starch. Battista teaches that these dispersions are useful as bases for cosmetics and pharmaceutical preparations, foods, and packaging films, but does not mention their use as fat replacements. A process for producing granular dextrins is disclosed in Sugimoto, U.S. Pat. No. 3,799,805, issued Mar. 26, 1974, which is incorporated by reference. The dextrins are prepared by heating granular starch with acid in an aqueous solution of an organic solvent such as propanol, ethanol, methanol, acetone, and fatty acids. Sugimoto teaches that the resulting dextrins are useful in the production of maltodextrins, but contains no suggestion regarding their use as fat replacements. Another type of aqueous alcohol-treated starch is disclosed in Eastman, U.S. Pat. No. 4,837,314, issued Jun. 6, 1989. These starches are highly derivatized prior to alcohol treatment and are used as replacements for gum arabic.

Despite all the attempts to provide a versatile fat replacement from starch, none has heretofore been discovered and the search continues throughout the food industry.

SUMMARY OF THE INVENTION

A general object of this invention is to provide an improved means of reducing the level of fat in foods. Another general object of this invention is to provide foods having a reduced level of fat.

I have invented such an improved means of reducing the amount of fat in food. The method involves the replacement of at least some of the fat with starch hydrolysates having a D.P. of about 20 to 200 and a D.E. of about 0.5 to 5 which are prepared by a process comprising: (a) Preparing a slurry of a granular starch containing at least about 20 weight percent amylopectin, water, a water-miscible organic solvent, and sufficient acid to provide a Normality to the slurry of about 0.1 to 2.0; (b) Heating the slurry under conditions sufficient to cleave at least about 20 percent of the terminal amylose groups from the amylopectin molecules, but without gelatinizing the starch; and (c) Separating the resulting granular starch hydrolysates from the liquid.

I have also invented such foods with reduced levels of fat. The foods contain starch hydrolysates having a D.P. of about 20 to 200 and a D.E. of about 0.5 to 5 as a replacement for at least some of the fat in the food. The hydrolysates are prepared by a process comprising: (a) Preparing a slurry of a granular starch containing at least about 20 weight percent amylopectin, water, a water-miscible organic solvent, and sufficient acid to provide a Normality to the slurry of about 0.1 to 2.0; (b) Heating the slurry under conditions sufficient to cleave at least about 20 percent of the terminal amylose groups from the amylopectin molecules, but without gelatinizing the starch; and (c) Separating the resulting granular starch hydrolysates from the liquid.

These starch hydrolysates are superior fat replacements in that they mimic the organoleptic properties of fat and can be used in a wide variety of foods. They are prepared in a single-step, high-yield process which rapidly goes to completion. The hydrolysates are easily separated from the liquid and there is no need to guard against biological contamination.

DETAILED DESCRIPTION OF THE INVENTION

1. Slurry Composition

The starch hydrolysates of this invention are prepared by heating a granular starch in a slurry of water, a water-miscible organic solvent, and acid under conditions which cleave the terminal amylose groups from the amylopectin molecules. The granular starch contains at least about 20 weight percent amylopectin. The source of the starch is not critical and starches derived from corn, potatoes, wheat, barley, rice, tapioca, etc., and blends thereof are all suitable. Mild chemical modification of up to about 0.04 D.S. (1 substituent group per 25 anhydroglucose units) is acceptable. In particular, mild substitution with, e.g., octenylsuccinate groups or crosslinking with phosphorus oxychloride, sodium trimetaphosphate, or epichlorohydrin has value because such modified starches exhibit improved clouding properties which are desirable in some fat replacement applications. Further modification begins to interfere with the fat-mimicking behavior of the starch hydrolysates. The preferred starch is a high-amylopectin starch because of its large amount of terminal amylose groups. The most preferred starch is an unmodified waxy maize corn starch having nearly 100 percent amylopectin. For economic reasons, the slurry typically contains the maximum amount of starch which can be readily pumped. The slurry generally contains about 10 to 50 weight percent starch and preferably contains about 20 to 40 weight percent starch, on a dry substance basis.

In addition to water, the slurry contains a water-miscible organic solvent such as acetone or one or more of the lower-chain alcohols, including methanol, ethanol, n-propanol, and isopropanol. The preferred solvent is ethanol because of its low toxicity in foods. Ethanol is generally available commercially in a denatured form. A preferred form of denatured ethanol is grade 3A which contains minor amounts of methanol and water. The water and solvent comprise about 50 to 90 weight percent of the slurry. Of the liquid medium, the solvent generally comprises the major portion, preferably about 60 to 90 weight percent, and most preferably about 70 to 85 weight percent.

The slurry is acidified to a Normality of about 0.1 to 2.0, preferably about 0.5 to 1.5, with a mineral acid such as sulfuric, phosphoric, or hydrochloric. Higher acidities result in more cleavage of the terminal amylose groups, other things being equal. Sulfuric acid is preferred because it is the least corrosive of the common mineral acids. Thus, a preferred slurry composition is about 25 weight percent waxy maize corn starch (on a dry substance basis), 57 weight percent ethanol, and 18 weight percent water acidified to 1.0 Normality with sulfuric acid (expressed as equivalents per liter of acidic aqueous ethanol).

2. Processing Conditions

The slurry is heated, and the hydrolytic reaction conducted, under conditions which preferentially cleave the 1,6-linkages and thus separate the terminal amylose groups from the amylopectin molecules, but which do not cause gelatinization of the starch granules. It is preferred to cleave at least about 20 percent of the terminal amylose groups, more preferred to cleave at least about 40 percent, and most preferred to cleave as many as economically feasible. As explained below, the cleaved terminal amylose groups (which can be referred to as terminal amylose residues) are believed to be primarily responsible for the fat replacement properties of the starch hydrolysates of this invention.

The temperature, pressure, and reaction time are inter-related variables. Other things being equal, a higher reaction temperature increases the reaction rate and results in more cleavage. However, the temperature should not exceed the boiling point of the slurry at the pressure of the system, nor should the temperature exceed that which would cause gelatinization. The temperature at which gelatinization occurs is a function of many variables, including the water content of the slurry and the period of time the slurry is heated. Gelatinization is avoided for two reasons. First, subsequent processing steps, including filtration and drying, are performed more easily with granular starches. Second, the undesired cleavage of 1,4-linkages occurs much more under such conditions. In general, the slurry is heated at a temperature of about 40° to 150° C. In an atmospheric-pressure system, the preferred temperature is about 50° to 80° C. and most preferably about 60 to 70° C. In an autogenous system, e.g., a closed vessel where the pressure equals the combined vapor pressures of the slurry components, the preferred temperature is about 70° to 150° C.

The reaction is generally carried out at a pressure of about one to 20 atmospheres. As pressure increases, the temperature at which the reaction can be conducted without boiling increases and the amount of water which will cause the starch to gelatinize decreases. Therefore, an elevated pressure is preferred when the minimization of reaction time is desired. On the other hand, the need for sophisticated processing equipment is minimized when the reaction is conducted at atmospheric pressure.

The time required for the reaction to reach completion is heavily dependent upon the reaction temperature. With a reaction temperature in the range of about 100° to 150° C., completion is achieved in about 10 to 30 minutes. At atmospheric pressure with temperatures of about 40° to 70° C., the reaction time is typically about 10 to 72 hours.

After the reaction has gone to the desired degree of completion, the starch granules are separated from the liquid medium, typically by filtration. The granules are then generally washed repeatedly to remove the acid. Washing also helps remove various undesirable materials such as color, fat, protein, and foreign matter. Washing is generally conducted with a liquid similar in composition to the liquid medium. Washing with pure water is often undesirable because it can cause the granules to swell prematurely. After washing, the granular starch hydrolysates are dried, typically in a desolventizer where the vapors are condensed for reuse. It bears repeating that virtually the entire starch granule is recovered as product. If desired, the reaction can be terminated immediately by the addition of a base, e.g., sodium hydroxide, to neutralize the acid. Neutralization also reduces the amount of washing needed to give a bland product of low color.

3. Properties of Starch Hydrolysates

The granular starch hydrolysates of this invention contain a relatively high level of terminal amylose residues having a D.P. of about 10 to 50, most of which are in the 10 to 30 range, which have been cleaved from the amylopectin molecules. These residues are unique in that they are uniformly linear and of a relatively narrow D.P. range. The granular starch hydrolysates (the residues plus the debranched amylopectin molecules) have an average D.P. of about 20 to 200 and a D.E. of about 0.5 to 5. The hydrolysates preferably have an average D.P. of about 20 to 50 and a D.E. of about 1 to 4.

While not wishing to be bound by theory, it is believed that the presence of the water-miscible organic solvent causes a selective cleavage of the 1,6-linkages to occur during the acid-catalyzed hydrolytic reaction. This selective cleavage, in turn, produces the large number of linear, terminal amylose residues having the relatively narrow D.P. range. As explained below, these residues are believed to be primarily responsible for the fat replacement properties of the starch hydrolysates.

4. Use as Fat Replacements

The granular starch hydrolysates of this invention are heated and/or subjected to shear to rupture the granules in situ or prior to use in food. This rupturing of the granule is necessary so that the cleaved terminal amylose residues are able to disperse into the food. It is believed that the residues tend to associate together to form microcrystals inside the granule. It is further believed that these microcrystals may remain intact if the granules are ruptured under relatively mild conditions of heat and shear. Alternatively, the granules may be ruptured under more extreme conditions causing the residues to separate and dissolve. After dissolution, the residues are allowed to reassociate to form clusters, aggregates, or microcrystals having a size of a few hundred angstroms held together by hydrogen bonding. The relatively strong hydrogen bonding is believed to be attributable to the unique linearity and narrow D.P. range of the residues. It is these associations of the linear terminal amylose residues which apparently enables the starch hydrolysates of this invention to mimic the organoleptic and functional properties of fat. The debranched amylopectin molecules are believed to play a less important role in fat replacement. These molecules are believed to function primarily as diluents and bulking agents. As such, they are not detrimental to the food compositions.

The starch hydrolysates are useful over a very broad range of solids, e.g., about 1 to 75 weight percent, and in a wide variety of foods, including salad dressings, frostings, glazes, cream fillings, ice creams, margarines, cottage cheeses, yogurts, puddings, candies, sauces, toppings, syrups, cheesecakes, breads, cakes, muffins, pastries, cookies, and crackers. While these hydrolysates are primarily suited for use as fat replacements, they are also useful in other food applications such as replacements for caseinate in cheeses and in non-food applications such as pharmaceuticals.

I claim:

1. A method of reducing the amount of fat in food by using granular starch hydrolysates having a D.P. of about 20 to 200 and a D.E. of about 0.5 to 5 as a replacement for at least some of the fat, which hydrolysates are prepared by a process comprising:
   (a) Preparing a slurry of a granular starch containing at least about 20 weight percent amylopectin, water, a water-miscible organic solvent, and sufficient acid to provide a Normality to the slurry of about 0. 1 to 2;
   (b) Heating the slurry under conditions sufficient to cleave at least about 20 percent of the terminal amylose groups from the amylopectin molecules, but without gelatinizing the starch; and
   (c) Separating the resulting granular starch hydrolysates from the liquid.

2. The method of claim 1 wherein the water-miscible organic solvent comprises ethanol.

3. The method of claim 1 wherein the initial granular starch comprises an unmodified waxy maize corn starch.

4. The method of claim 1 wherein the slurry has a Normality of about 0.5 to 1.5.

5. The method of claim 1 wherein the slurry comprises about 20 to 40 weight percent starch.

6. The method of claim 1 wherein the water-miscible organic solvent comprises about 60 to 90 weight percent of the liquid in the slurry.

7. The method of claim 1 wherein the slurry is heated under conditions sufficient to cleave at least about 40 percent of the terminal amylose groups.

8. The method of claim 1 wherein the slurry is heated at about atmospheric pressure and at a temperature of about 50° to 80° C.

9. The method of claim 1 wherein the slurry is heated at or above autogenous pressure and at a temperature of about 70° to 150° C.

10. A food composition containing starch hydrolysates having a D.P. of about 20 to 200 and a D.E. of about 0.5 to 5 as a replacement for at least some of the fat in the food, which hydrolysates are prepared by a process comprising:
    (a) Preparing a slurry of a granular starch containing at least about 20 weight percent amylopectin, water, a water-miscible organic solvent, and sufficient acid to provide a Normality to the slurry of about 0. 1 to 2.0;
    (b) Heating the slurry under conditions sufficient to cleave at least about 20 percent of the terminal amylose groups from the amylopectin molecules, but without gelatinizing the starch; and
    (c) Separating the resulting granular starch hydrolysates from the liquid.

11. The composition of claim 10 wherein the water-miscible organic solvent comprises ethanol.

12. The composition of claim 10 wherein the initial granular starch comprises an unmodified waxy maize corn starch.

13. The composition of claim 10 wherein the slurry has a Normality of about 0.5 to 1.5.

14. The composition of claim 10 wherein the slurry comprises about 20 to 40 weight percent starch.

15. The composition of claim 10 wherein the water-miscible organic solvent comprises about 60 to 90 weight percent of the liquid in the slurry.

16. The composition of claim 10 wherein the slurry is heated under conditions sufficient to cleave at least about 40 percent of the terminal amylose groups.

17. The composition of claim 10 wherein the slurry is heated at about atmospheric pressure and at a temperature of about 50° to 80° C.

18. The composition of claim 10 wherein the slurry is heated at or above autogenous pressure and at a temperature of about 70° to 150° C.

* * * * *